United States Patent
Lee et al.

(10) Patent No.: US 8,971,699 B2
(45) Date of Patent: Mar. 3, 2015

(54) OPTICAL NETWORK FAILURE RECOVERY METHOD

(71) Applicant: Industrial Technology Research Institute, Hsin-Chu (TW)

(72) Inventors: Steven S. W Lee, Chiayi County (TW); Yao-Min Peng, New Taipei (TW); Hui-Ru Shen, Hsinchu (TW); Yi-Hung Hsiao, New Taipei (TW); Chi-Chien Chang, New Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 213 days.

(21) Appl. No.: 13/859,151

(22) Filed: Apr. 9, 2013

(65) Prior Publication Data

US 2014/0161436 A1      Jun. 12, 2014

(30) Foreign Application Priority Data

Dec. 7, 2012   (TW) .............................. 101146091 A (51) Int. Cl.
| | |
|---|---|
| G02F 1/00 | (2006.01) |
| G02F 2/00 | (2006.01) |
| H01S 3/00 | (2006.01) |
| H04B 10/00 | (2013.01) |
| H04J 14/00 | (2006.01) |
| H04B 10/03 | (2013.01) |
| H04B 10/272 | (2013.01) |
| H04J 3/16 | (2006.01) |

(52) U.S. Cl.
CPC .............. *H04B 10/03* (2013.01); *H04B 10/272* (2013.01); *H04J 3/1694* (2013.01)
USPC .................................................... 398/1; 398/8

(58) Field of Classification Search
None
See application file for complete search history.

(56) References Cited

U.S. PATENT DOCUMENTS

| | | | |
|---|---|---|---|
| 7,808,913 | B2 | 10/2010 | Ansari et al. |
| 2002/0171895 | A1 | 11/2002 | Chang |

(Continued)

FOREIGN PATENT DOCUMENTS

| | | |
|---|---|---|
| CN | 101516047 B | 8/2009 |
| CN | 101534460 B | 9/2009 |

(Continued)

OTHER PUBLICATIONS

P'ng, et al, "Protection Networking of Ethernet PON FTTH Access Network", Sep. 15-17, 2005, pp. 180-183, IEEE.

(Continued)

*Primary Examiner* — David Payne
*Assistant Examiner* — Casey Kretzer
(74) *Attorney, Agent, or Firm* — WPAT, PC; Justin King (57) ABSTRACT

An optical network failure recovery method for a passive optical network is provided. The method includes steps of: obtaining at least one round-trip delay value according to an equalization delay value of at least one optical network unit with respect to an operating optical line terminal; sorting the round-trip delay values in an increasing order and obtaining a minimum round-trip delay value; obtaining at least one difference between the minimum round-trip delay value and the round-trip delay value of each of the optical network units; and adjusting a start time and a stop time in a bandwidth map for a ranging response message replied by each of the optical network units according to the at least one difference.

9 Claims, 6 Drawing Sheets

(56) References Cited

U.S. PATENT DOCUMENTS

| | | | |
|---|---|---|---|
| 2006/0268704 A1 | | 11/2006 | Ansari et al. |
| 2008/0212480 A1* | | 9/2008 | Shimonishi .................. 370/236 |
| 2009/0263132 A1 | | 10/2009 | Rafel et al. |
| 2010/0098407 A1* | | 4/2010 | Goswami et al. ................. 398/5 |
| 2010/0321468 A1* | | 12/2010 | Hosseini et al. .......... 348/14.08 |
| 2011/0044683 A1 | | 2/2011 | Trojer |
| 2011/0280568 A1 | | 11/2011 | Dvir et al. |
| 2011/0317998 A1* | | 12/2011 | Fujimura ....................... 398/25 |
| 2013/0148956 A1* | | 6/2013 | Khotimsky et al. ............... 398/2 |

FOREIGN PATENT DOCUMENTS

| | | |
|---|---|---|
| CN | 102176682 A | 9/2011 |
| CN | 102469007 A | 5/2012 |
| EP | 2249499 | 11/2010 |

OTHER PUBLICATIONS

Seol, et al, "A Simple Passive Protection Structure in a Ring-Type Hybrid WDM/TDM-PON", Feb. 15-18, 2009, pp. 447-449, ICACT.

Mitsui, et al, "Flexible and Scalable PON Protection Architecture using N:M Redundancy toward Next Generation Access Network", 2011, pp. 224-229, IEEE.

Ab-Rahman, et al, "Transmission surveillance and self-restoration against fibre fault for time division multiplexing using passive optical network", 2009, pp. 1896-1906, vol. 3, Iss. 12, The Institution of Engineering and Technology.

Tanaka, et al, "1:N. OLT Redundant Protection Architecture in Ethernet PON System", 2008, IEEE.

Nadarajah, et al, "Protection Switching and Local Area Network Emulation in Passive Optical Networks", May 2006, pp. 1955-1967, vol. 24, No. 5, Journal of Lightwave Technology.

Taiwan Patent Office, "Office Action", Aug. 11, 2014.

* cited by examiner

```
for i := 1 to N do
    x_i := RTD_i - RTD_1;
s_1 = 0;
y_1 = 12;
for i := 2 to N do
begin
    if y_{i-1} < x_i
        s_i := 0;  y_i := x_i + 12;
    else
        s_i := y_{i-1} - x_i + 1;  y_i := y_{i-1} + 13;
end
```

FIG. 4A

|      | $RTD_i$ | $x_i$ | $s_i$ | $y_i$ |
|------|---------|-------|-------|-------|
| ONU1 | 1       | 0     | 0     | 12    |
| ONU2 | 3       | 2     | 11    | 25    |
| ONU3 | 5       | 4     | 22    | 38    |
| ONU4 | 200     | 199   | 0     | 211   |

```
for i := 1 to N do
    x_i := RTD_i − RTD_1;
s_1 = overhead + diff;
y_1 = s_1 + δ − 1;
for i := 2 to N do
begin
    if y_{i−1} < x_i
        s_i := 0;  y_i := x_i + δ − 1;
    else
        s_i := y_{i−1} − x_i + 1;  y_i := y_{i−1} + δ;
end
```

FIG. 5

OPTICAL NETWORK FAILURE RECOVERY METHOD

CROSS REFERENCE TO RELATED APPLICATION

This application claims the benefit of Taiwan application Serial No. 101146091, filed Dec. 7, 2012, the disclosure of which is incorporated by reference herein in its entirety.

TECHNICAL FIELD

The disclosed embodiments relate in general to an optical network failure recovery method, and more particularly to an optical network failure recovery method for a passive optical network.

BACKGROUND

Description of the Related Art

As a counteraction against communication breakdowns caused by optical line disconnections or equipment malfunctions, a network needs to have an appropriate protection capability in order to provide reliable communication services. Conventionally, to provide a gigabit-capable passive optical network (GPON) with a failure recovery capability, the ITU Telecommunication Standardization Sector (ITU-T) suggests several GPON architectures with survivability. In the event of a network failure or disconnection, a backup optical line terminal (OLT) becomes a new operating OLT that takes over the original operating OLT. The new OLT is required to immediately obtain distance values of individual optical network units (ONU) to restore normal operations of the optical network. Among the suggested GPON architectures, the type B and the type C are most common.

Figure 1:
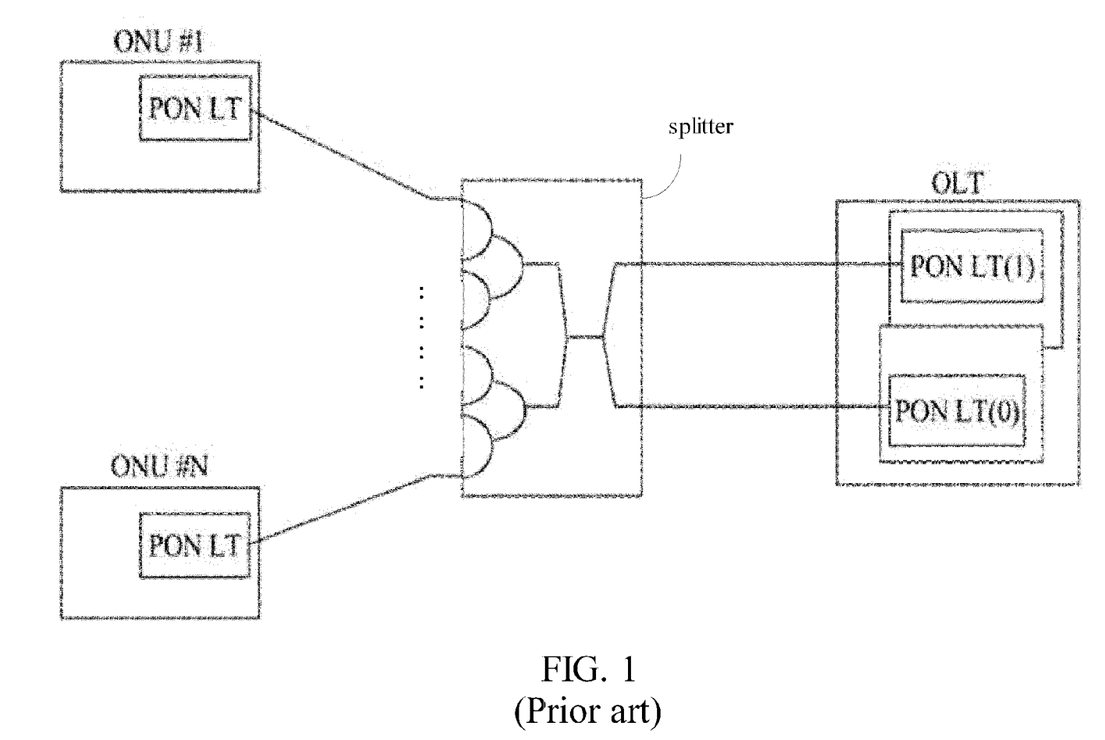
FIG. 1 is a architecture of a conventional GPON type B.
Figure 2:
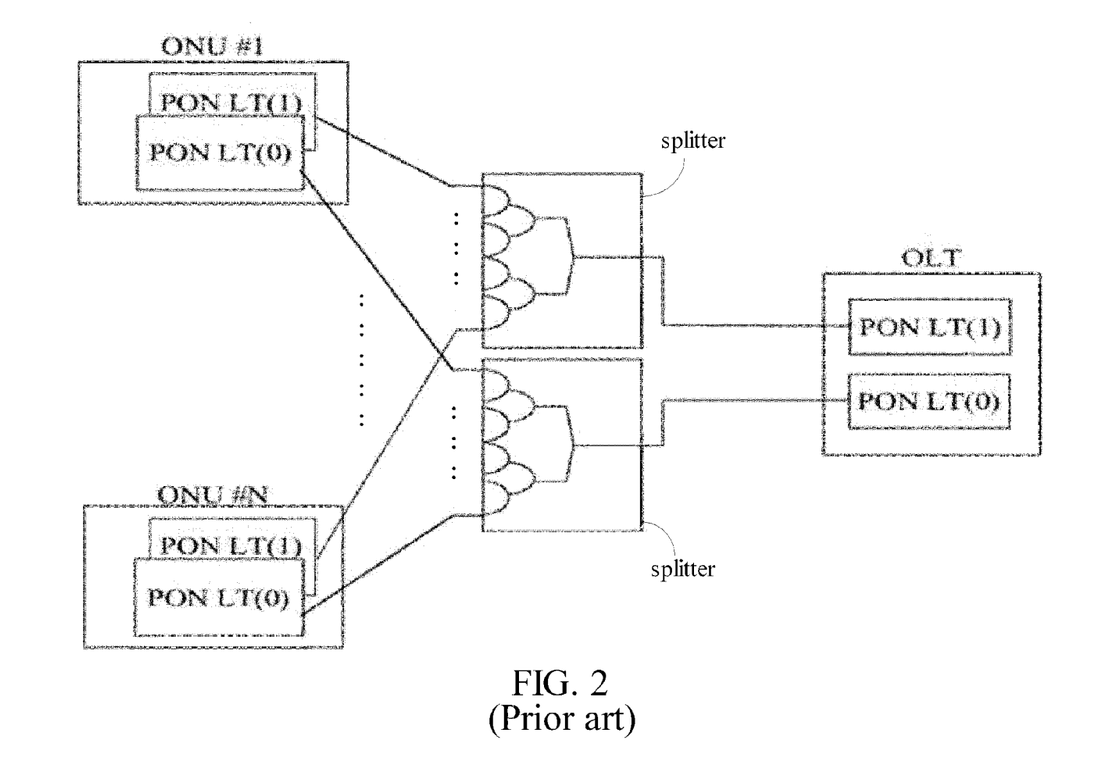
FIG. 2 is a architecture of a conventional GPON type C.

Referring to FIG. 1 showing a GPON type B architecture, each GPON network in the GPON type B architecture includes one or two OLTs, each of which further including multiple passive optical network line terminals (PON LT). Taking a single OLT including two PON LT(0) and PON LT(1) in FIG. 1 for example, each of the PON LTs has a respectively optical line connected to a splitter, and each client terminal is equipped with one ONU (also including one PON LT). In the above architecture, one of the two PON LTs of the OLT is an operating PON LT that is in charge of communications of the network with individual ONUs under a normal operating condition of the network, whereas the other PON LT is a backup PON LT. The two PON LTs may belong to the same OLT or to different OLTs. Further, under the GPON type B architecture, in the event of a PON LT failure of a single OLT or a disconnection of a single optical line between the PON LT of the OLT and the splitter, the failure may be recovered by the other PON LT and the other optical line. Similarly, in addition to two PON LTs, each ONU at the client terminal in a GPON type C architecture also has two PON LTs. The two PON LTs of the ONU employ different optical lines from those of the PON LTs of the OLT. Whether to adopt the type B or the type C architecture is determined according to protection requirements and system cost considerations. The type B architecture is frequently selected by common network service providers as the type B architecture is lower in equipment cost. However, due to network characteristics of the type B architecture, when a malfunction occurs in the operating PON LT of the OLT, all the ONUs need to be sequentially re-ranged by the backup PON LT that takes over original tasks of the original operating PON LT of the OLT. As a result, time needed for recovery is lengthened due to the quite time-consuming re-ranging process.

SUMMARY

According to one embodiment, an optical network failure recovery method for a passive optical network is provided. The method includes steps of: obtaining at least one round-trip delay (RTD) value according to an equalization delay (EqD) value of at least one optical network unit (ONU) with respect to an operating optical line terminal (OLT); sorting the RTD values in an increasing order and obtaining a minimum RTD value; obtaining at least one difference between the minimum RTD value and the RTD value of each of the optical network units; and adjusting a start time and a stop time in a bandwidth map for a ranging response message replied by each of the ONUs according to the at least one difference.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 3:
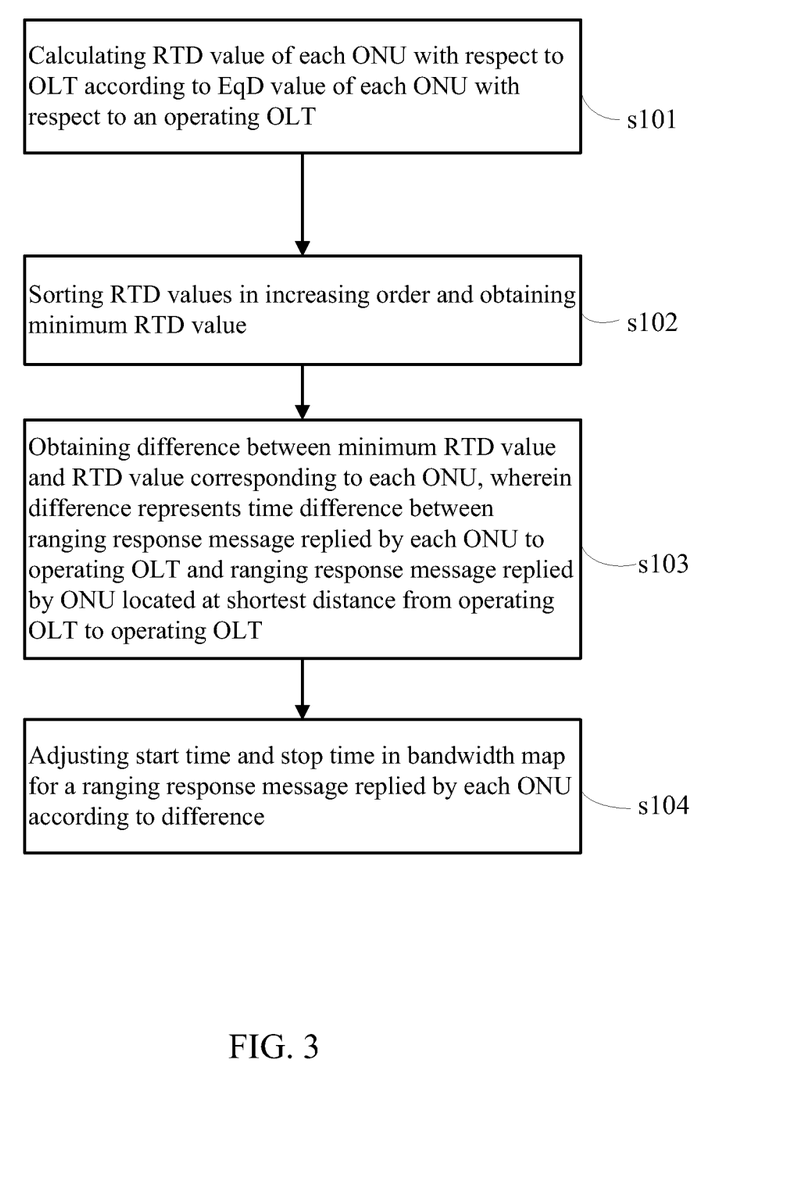
FIG. 3 is a flowchart of an optical network recovery method for a passive optical network according to one embodiment.

FIG. 3 shows a flowchart of an optical network failure recovery method for a passive optical network according to one embodiment. The optical network failure recovery method includes the following steps. In step s101, according to an equalization delay (EqD) value of each optical network unit (ONU) with respect to an operating optical line terminal (OLT), a round-trip delay (RTD) value of the ONU with respect to the operating OLT is calculated. The EqD value is obtained by a measuring step. Since a GPON is a time division multiplexing network, according to GPON standards, an OLT needs to first range an ONU and assign an EqD value to the ONU before allowing the ONU to transmit upstream data. The ONU needs to wait for a period of the assigned EqD before transmitting the upstream data in order to prevent collisions between the upstream data of the ONU and upstream data of other ONUs. In a so-called ranging process, an operating OLT transmits a ranging request message to an ONU, which replies a ranging response message to the operating OLT. The OLT then calculates the EqD value after receiving the ranging response message. Such measuring approach involving the back-and-forth messages includes the time of the RTD period, and so the RTD value can be deduced from the EqD value.

In step s102, the RTD values are sorted in an increasing order and renumbered to obtain a minimum RTD. In step s103, a difference between the minimum RTD value and the RTD value of each ONU is obtained. The difference represents a time difference between the ranging response message replied by each ONU to the operating OLT and the ranging response message replied by the ONU located at a minimum distance from the operating OLT to the operating OLT. In step s104, a start time and a stop time in a bandwidth map are adjusted for a ranging response message replied by each ONUs, such that the ranging response messages do not collide one another.

In the event of a failure, in the optical network failure recovery method according to one embodiment, the exemplary backup OLT (to be referred to as OLT2) takes over the original operating OLT (to be referred to as OLT1), and performs a re-ranging process to determine the EqD values between a new path and the ONUs. Due to unknown distances between the OLT2 to individual ONUs, a period of a quiet window of 202 µs is preserved in an upstream when ranging the ONUs according to a general GPON network ranging procedure in order to prevent signal collisions during the ranging process. During the quiet window period, only the ONU under ranging is allowed to transmit upstream signals. As described, a substantial amount of time is consumed by the re-ranging process above. Thus, to reduce the time consumed by the re-ranging process, by fully exercising old EqD values of the ONUs with respect to the original OLT1, the re-ranging process is performed to complete the determination of the new EqD values for all of the ONUs within a short period. Although distances between the individual ONUs and the OLT2 remain unknown before re-ranging for the new EqD values, scheduling can nevertheless be carried out in a way that the responses from the ONUs stay free from collisions.

Figure 4A:
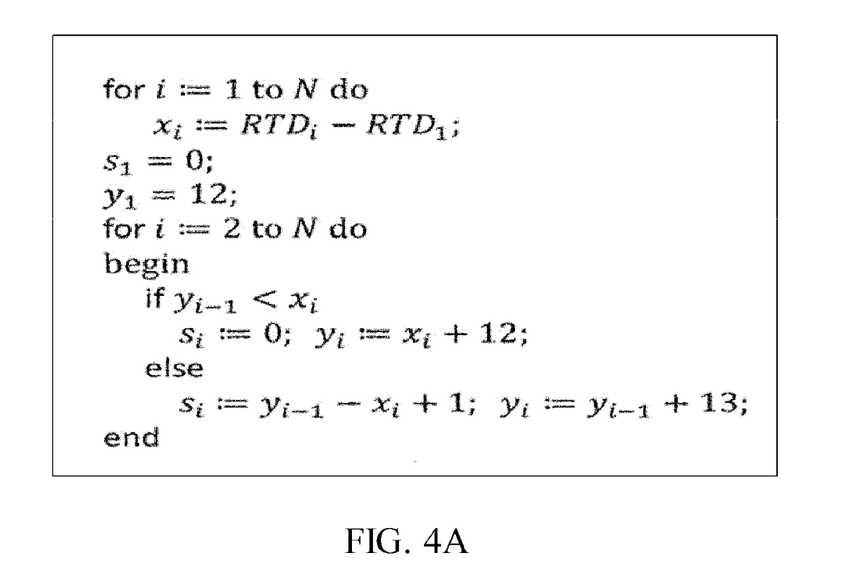
FIG. 4A is an algorithm for verifying the disclosure.
Figure 4B:
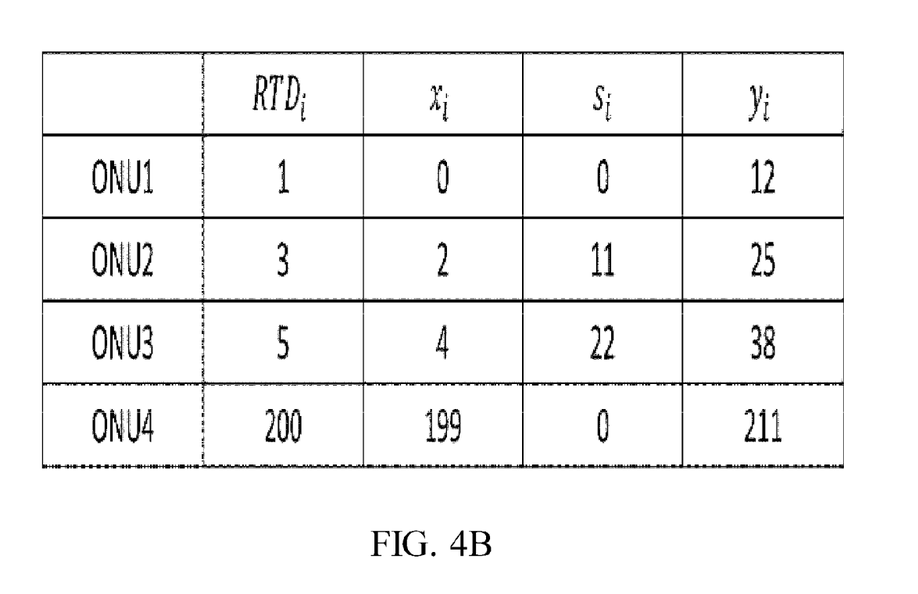
FIG. 4B is a bandwidth map for verifying the disclosure.
Figure 4C:
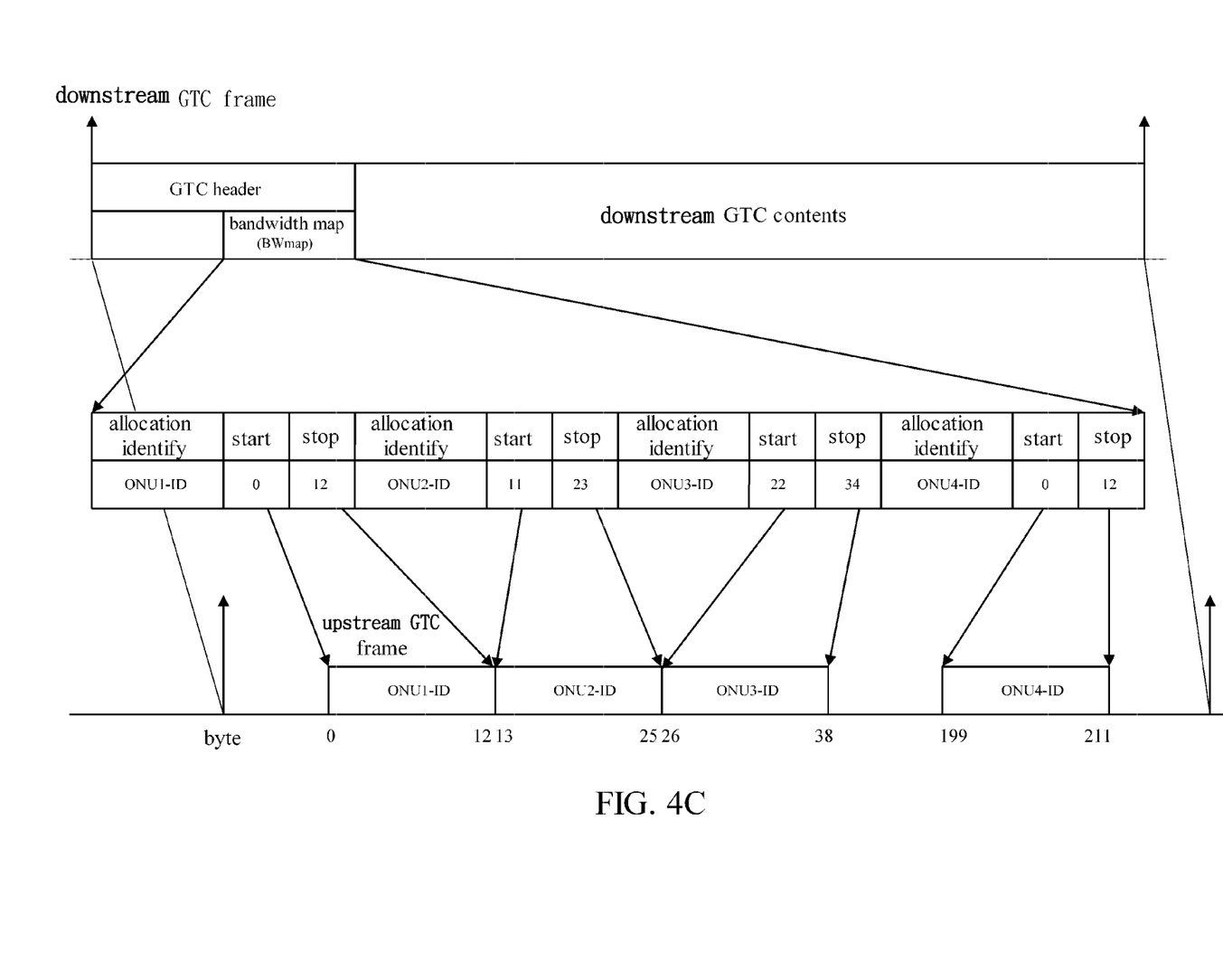
FIG. 4C is a downstream GTC frame implementing the algorithm in FIG. 4A and the bandwidth map in FIG. 4B.

FIG. 4A shows an algorithm for verifying the disclosure; FIG. 4B shows a bandwidth map for verifying the disclosure; and FIG. 4C shows a downstream gigabit-capable passive optical network transmission convergence (GTC) frame implementing the algorithm in FIG. 4A and the bandwidth map in FIG. 4B. As shown in FIGS. 4A to 4C, a unit of bytes is utilized. First, an RTD value of each ONU with respect to the OLT1 is calculated. Since RTD=zero-distance equalization delay−EqD, the RTD value can be deduced from the previous known EqD values with respect to the OLT1. The RTD values of the ONUs are sorted in an increasing order, and for example, re-numbered (e.g., ONU1 to ONU4 in FIG. 4B). Assuming that an N number of ONUs are present in the system, the obtained values are recorded as $RTD_1$, $RTD_2$ . . . and $RTD_N$. That is, the ONU1 has the minimum value $RTD_1$, and the ONU(N) has the maximum value $RTD_N$. A purpose of the scheduling is to determine a start time $s_i$ filled in a ranging request message of the ONU(i) with respect to the backup OLT. Based on the known RTD values of the ONUs, the ONU1 (having the minimum RTD value) is ranged and the start time of a parameter carried in the ranging request message of the ONU1 is to set 0, and the time at which the OLT2 receives the ranging response message from the ONU1 is set as the start time (i.e., $x_1$=0). It is then checked whether the start time of the ONU(i) can be set to 0 without colliding ONU(i−1). Assume that the last byte of the ranging response message replied from ONU(i−1) is $y_{i-1}$. If the first byte $x_i$ of a next ranging response received by ONU(i) when the start time is set to 0 comes after $y_{i-1}$, it is confirmed that the start time of ONU(i) can be set to 0 without causing collisions, or else the start time of ONU(i) needs to be further delayed to prevent collisions. In order to shorten the overall ranging process, the above scheduling is arranged in a most compact manner, i.e., the OLT2 receives the first byte of ONU(i) immediately after receiving the last byte of ONU(i−1). Referring to FIGS. 4A to 4B, after the ranging process begins, one upstream GTC frame (125 µs) having all of the ranging responses is received after the zero-distance equalization delay (250 µs), which is in equivalence completing the ranging process of all the ONUs within 375 µs, thereby significantly reducing the recovery time.

Figure 5:
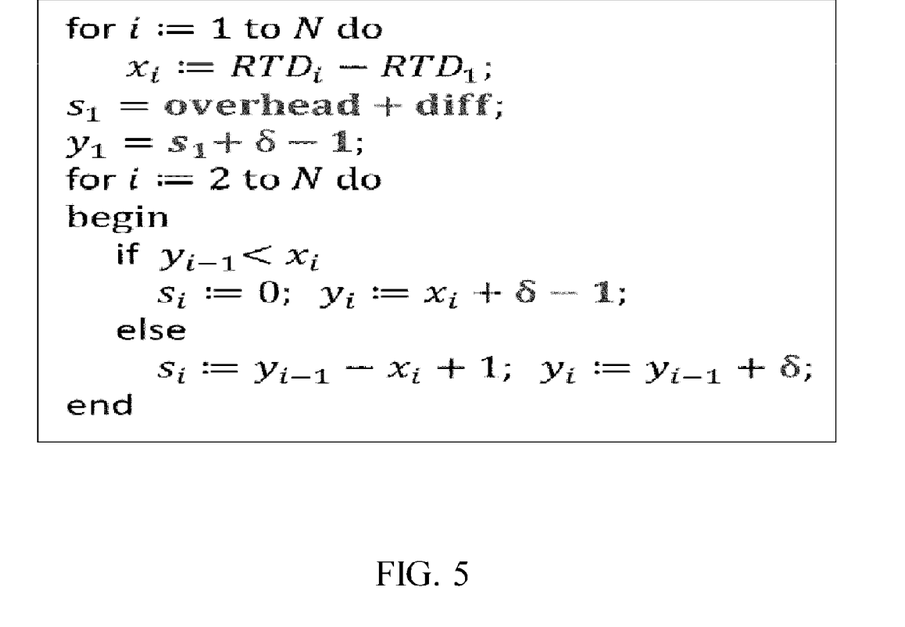
FIG. 5 is an algorithm with an added system parameter 8 according to one embodiment.

However, slight errors in the original RTD values measured by different ONUs and a guard band needed for different ONUs received by the OLT are not considered in the embodiment in FIGS. 4A to 4C. In practice, desired predetermined period or system parameters can be added to prevent overlapping and collisions caused by ranging responses from the ONUs. For example, FIG. 5 shows an algorithm with an added system parameter 8. For example, the system parameter δ includes 13 bytes needed by the ranging response, the guard band needed by the OLT and possible slight errors in the originally measured RTD values.

To accelerate the recovery time, the above scheduling algorithm may be predetermined before the occurrence of the network failure, so that the OLT2 is capable of immediately replacing the OLT1 to send and complete the ranging requests to all of the ONUs in the event of a failure. Based on the above scheduling, the ranging requests may all be placed in a downstream GTC frame, where an allocation identity (Alloc-ID) of an $i^{th}$=an $i^{th}$ ONU-ID, the start time=$s_i$, and the stop time=$s_i$+12. Thus, by scheduling the response time for the ranging requests of the ONUs according to the obtained start time $s_i$, it is ensured that the responses of the ONUs are collision-free.

The high-speed protection mechanism according to the disclosure for the type B network provides a failure recovery time of shorter than 50 ms while also satisfying specifications of telecommunication standards. As a GPON network is a time division multiplexing (TDM) network, the OLT needs to precisely range the ONUs in order to prevent collisions of upstream data coming from different ONUs. Due to possible unequal distances from two OLTs or PON LTs and a splitter, the OLT taking over communication operations is required to re-range all the ONUs when switching from an operating route to a backup route for protection switching according to ITU-T G.984.3 specifications, so as to measure the RTD values between the backup path to the ONUs.

With the above embodiments, it is demonstrated in the event of a network failure, with the optical network failure recovery method of the disclosure, the new operating OLT fully exercises the EqD values of the ONUs with respect to the old OLT to perform the scheduling of a re-ranging process. Thus, the re-ranging process of all the ONUs can be scheduled and completed within a same GTC frame, and the ranging response messages replied from the ONUs are completely collision-free. Compared to re-registration of the ONUs in a conventional approach, the method of the disclosure significantly reduces the time for failure recovery. Further, in order to achieve maximum design compatibility, the optical network failure recovery method of the disclosure accomplishes a protection switching period of within 50 ms without changing message contents regulated by current G.984 specifications and ONU state transition diagrams.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An optical network failure recovery method for a passive optical network, comprising:
   obtaining at least one round-trip delay (RTD) value according to an equalization delay (EqD) value of an optical network unit (ONU) with respect to an operating optical line terminal (OLT);
   sorting the RTD value in a predetermined order, and obtaining a minimum RTD value;
   obtaining at least one difference between the minimum RTD value and the RTD value of each ONU; and
   adjusting a start time and a stop time in a bandwidth map for a ranging response message replied by each ONU according to the difference;
   wherein, when a failure of the optical network occurs, the start time and the stop time are utilized in a ranging step for each ONU.

2. The optical network failure recovery method according to claim 1, wherein the difference represents a time difference between the ranging response message replied by each ONU to the operating OLT and the ranging response message replied by the ONU located at a minimum distance from the operating OLT to the operating OLT.

3. The optical network failure recovery method according to claim 1, wherein the passive optical network is an ITU Telecommunication Standardization Sector (ITU-T) type B architecture.

4. The optical network failure recovery method according to claim 3, wherein a failure recovery period of the type B architecture less than 50 ms.

5. The optical network failure recovery method according to claim 1, wherein the EqD value is measured by ranging each ONU with respect to the OLT, and the measuring step comprises:
   the OLT transmitting a ranging request message to each ONU;
   the ONU replying the ranging request message to the OLT; and
   the OLT calculating the at least one EqD value.

6. The optical network failure recovery method according to claim 1, wherein the RTD value is a difference between a zero-distance equalization value and the EqD value.

7. The optical network failure recovery method according to claim 1, wherein the start time is added with a predetermined period or a system parameter to prevent overlapping or a collision caused by a range response.

8. The optical network failure recovery method according to claim 7, wherein the system parameter comprises 13 bytes needed by the ranging response, a guard band needed by the OLT, and an error when measuring the RTD value.

9. The optical network failure recovery method according to claim 1, wherein the start time and the stop time are predetermined before the failure of the optical network occurs.

* * * * *